S. E. WARD.
PAN LIFTER.
APPLICATION FILED JULY 2, 1908.
923,389. Patented June 1, 1909.
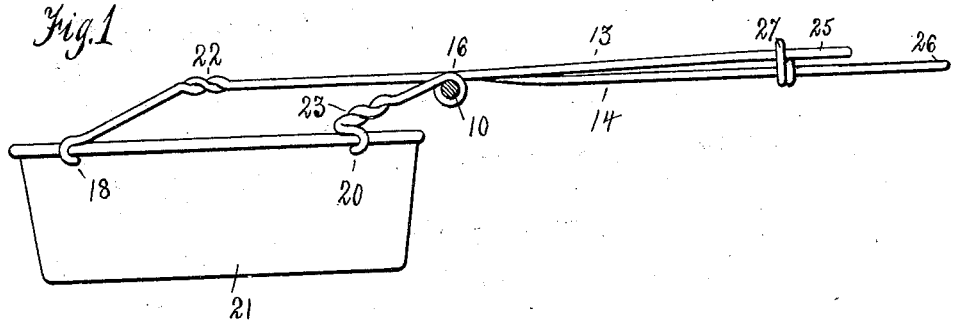
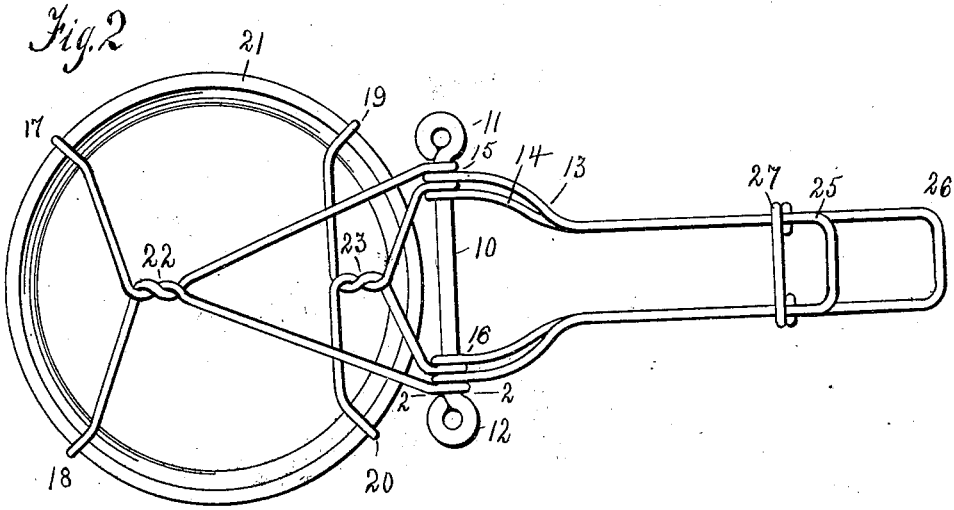
Witnesses.
Wm. L. Edmonston
C. N. Woodward
Samuel E. Ward,
Inventor,
By Shoemaker
Atty.

UNITED STATES PATENT OFFICE.

SAMUEL E. WARD, OF ALLEN, NEBRASKA.

PAN-LIFTER.

No. 923,389.  Specification of Letters Patent.  Patented June 1, 1909.

Application filed July 2, 1908. Serial No. 441,622.

*To all whom it may concern:*

Be it known that I, SAMUEL E. WARD, a citizen of the United States, residing at Allen, in the county of Dixon and State of Nebraska, have invented certain new and useful Improvements in Pan-Lifters, of which the following is a specification.

This invention relates to pan lifters, and has for one of its objects to simplify and improve the construction and increase the efficiency and utility of devices of this character.

Another object of the invention is to produce a device of this character wherein simplicity of construction and utility is combined with strength and durability.

Another object of the invention is to produce a device wherein the parts are so constructed and arranged as to mutually support and brace each other.

With these and other objects in view, the invention consists in a device of this character having an intermediate support or "backbone" and two members swinging upon the support and with pan engaging jaws at one end and superimposed handles at the other side and a locking means operating to connect the handles.

The invention further consists in a device of this character having an intermediate support and with two members each formed from a single piece of wire bent into U-shape and with the sides coiled around the support intermediate their ends, and the free ends bent into pan engaging hooks and with the sides of each wire member twisted together between the coils and terminal hooks, and a slidable lock-device engaging the wire members at the opposite side of the coils.

The invention further consists in certain novel features of construction, as hereafter shown and described and specifically pointed out in the claim, and in the drawings is shown the preferred embodiment of the invention, but it will be understood that changes within the scope of the appended claim may be made without departing from the principle of the invention or sacrificing any of its advantages.

In the drawings:—Figure 1 is a side view with the "backbone" member in section on the line 2—2 of Fig. 2. Fig. 2 is a plan view of the improved device applied.

The improved device comprises an intermediate support or "backbone" member 10 of relatively heavy wire and with enlargements 11—12 at the ends, the latter preferably in the form of eyes, as shown.

The main movable portions of the device are formed from two pieces of wire represented respectively at 13—14 and each bent into U shape, with the sides coiled at 15—16 around the member 10, so that the wire members are free to swing thereon. The terminals of the member 13 are bent into hooks or pan engaging jaws 17—18 while the terminals of the member 14 are bent into pan engaging hooks or jaws 19—20, the hooks 17—18 engaging the pan, represented at 21, at one side, and the hooks 19—20 engaging the pan at the opposite side, as shown. The sides of the member 13 are twisted around each other between the member 10 and the hooks 17—18 and bent downwardly, as shown at 22, and the sides of the member 14 are likewise twisted around each other between the member 10 and the hooks 19—20, as shown at 23, to strengthen and brace the members and are bent slightly downwardly from the coils. The portions of the members 13—14 at the opposite side of the member 10 from the pan engaging portions, form the handles, as at 25—26 by which the implement is operated, and are designed to be locked together by a sliding loop 27, as shown. The member 14 extends beyond the member 13 at the handle end, as shown, so that when the "jaws" are to be separated, the loop 27 may be moved upon the member 14 beyond the member 13, as will be obvious.

With an implement thus constructed, when a pan or like utensil is to be lifted, the loop 27 is moved beyond the handle end 26 of the member 13 and the handle ends separated, which correspondingly separates the jaw or hooked ends and enables them to be placed over the rim of the pan or other utensil, and then when the handle ends are brought together again, the jaws or hooks will firmly grip the pan, as shown, and this "grip" may be retained by slipping the loop 27 over the shorter member 13. The pan can then be lifted and carried any required distance and can be released by simply withdrawing the loop 27 and separating the members 13—14, as before.

Although both of the members 13 and 14 are movable relative to each other, still, when in use, the hook ends of the member 13 are first brought into engagement with the rim of the pan and then the member 14 is swung on the pivotal supporting member 10 to bring the hooks of the member 14 into engagement with the pan, so that the member 13 may be termed the immovable member and the member 14 the movable member.

The improved device is simple in construction, can be inexpensively manufactured and of any required size, and adapted for handling pans, plates, and other utensils or dishes of various sizes.

The wire of which the implement is constructed will preferably be galvanized, tinned or otherwise coated to prevent corrosion.

What is claimed is:—

An implement of the character described comprising a supporting member, two members each formed of a single piece of material bent intermediate its ends to form a handle portion, the sides of each handle portion being curved outwardly adjacent said supporting member and coiled around the ends of the latter, the sides of one member upon the side of said supporting member opposite the side upon which its handle portion is disposed being bent to converge and brought together and twisted to strengthen the converging portions, said converging portions lying in the same plane as the corresponding handle portion and the converging portions at the point where twisted together being directed downwardly and outwardly in diverging relation and again bent laterally with the extremities of the last mentioned bent portions formed into downwardly directed pan engaging hooks, the sides of the other member upon the side of said supporting member opposite the side upon which its handle portion is disposed being bent downwardly in converging relation from said supporting member and brought together and twisted and then directed away from each other in substantially a straight line and in a substantially horizontal plane and again bent laterally in a direction opposite to the last mentioned laterally bent portions of the other member with the last mentioned bent portions of the second mentioned member terminating in downwardly directed pan engaging hooks, all of the pan engaging hooks being disposed upon the same side of said supporting member with the hooks arranged to engage substantially four equidistant points on the pan, and means for locking the handle portions together.

In testimony whereof I affix my signature, in presence of two witnesses.

SAMUEL E. WARD.

Witnesses:
W. S. HART,
C. E. WARNE.